July 2, 1935. M. FAYOLLE 2,006,914
FILM SPACING IN STEREOSCOPIC APPARATUS
Original Filed July 1, 1929  2 Sheets-Sheet 1
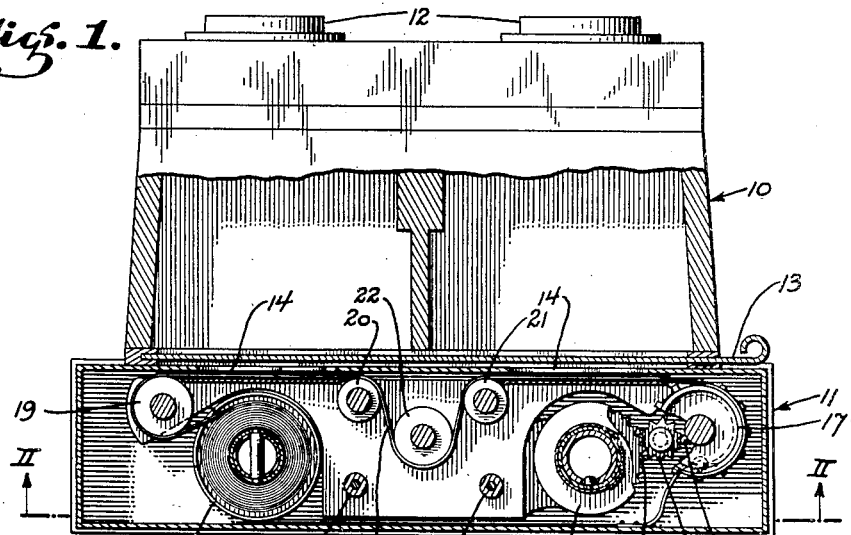
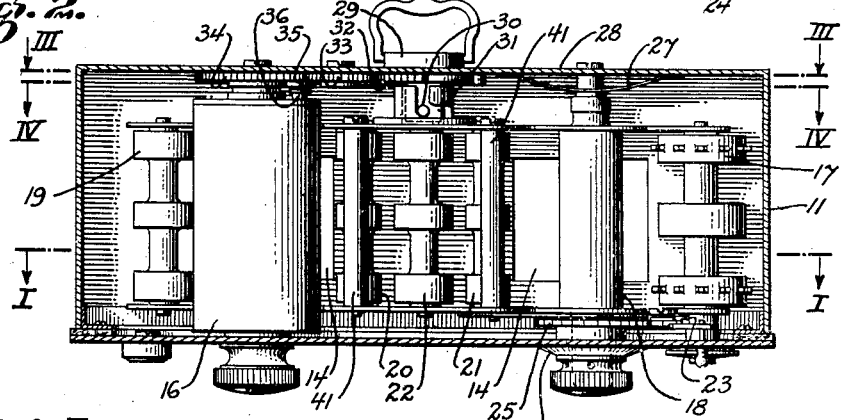
INVENTOR.
Maurice Fayolle.
BY Townsend, Loftus + Abbett
ATTORNEYS.

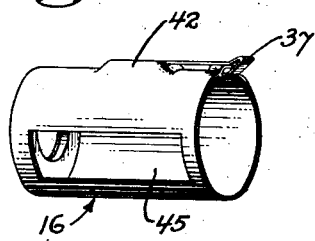
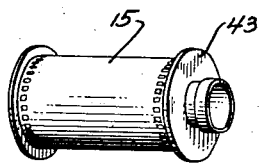
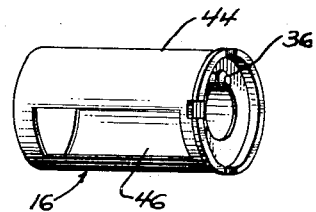
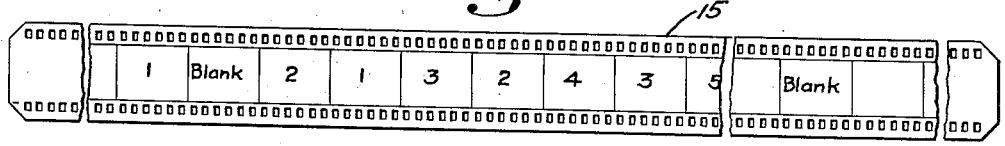
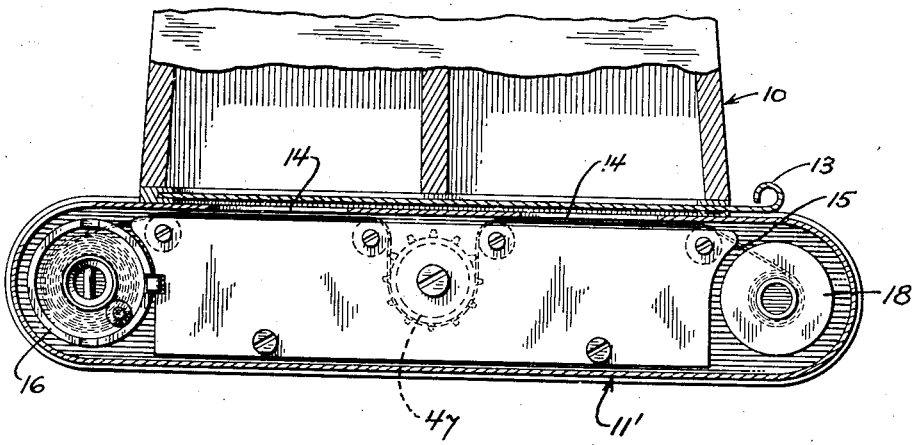

Patented July 2, 1935

2,006,914

UNITED STATES PATENT OFFICE 2,006,914

FILM SPACING IN STEREOSCOPIC APPARATUS

Maurice Fayolle, New York, N. Y.

Application July 1, 1929, Serial No. 375,050
Renewed October 9, 1933

10 Claims. (Cl. 95—18)

This invention has reference to the art of optical instruments or apparatus, and particularly relates to the taking, printing and viewing of stereoscopic pictures on standard, perforated negative and positive motion picture films, though it may apply also to ordinary photographic films formed in strips of somewhat similar dimension.

In cameras or viewers of the type to which my invention pertains, it has been found advantageous, in order to avoid the wasting of film, to interspace the stereoscopic pairs in the following order:

—1— —2—1—3—2—4—3—5—4—6—5—7—6— —7—, etc., the film being fed horizontally in a straight line from one reel to the other. As, for obvious reasons, it is important to have the lenses spaced at a distance equal to the normal spacing of the eyes, or 2½", the size of such pictures has, of necessity, been limited to the insufficient width of 4 or 4½ perforations. Not only is this limitation stereoscopically detrimental, but the picture is hardly large enough to give satisfactory paper prints of any size.

It is among the objects of my invention to provide, on said films, a larger, more advantageous and more rational picture size in conjunction with the above mentioned interspacing of the pictures. According to my invention, I obtain a picture of a width of 6 perforations by a novel spacing and handling of the film in the apparatus, this being done through the medium of a rotatable drum, having twelve teeth placed in the path of the film between the framing apertures which are facing the lenses, placed at the point of the normal eye separation. The film held by suitable guides goes around a portion of this drum, as shown in drawings, in such a way that the width of two pictures, or 12 perforations in the length of the film, are comprised between the said apertures, where the stereoscopic pair in use faces squarely the lenses, the course of the film being at these points parallel to the lens board.

While I have chosen the size of 6 perforations as most rational for the purpose, a somewhat larger or smaller size could be obtained by varying the size of the drum and framing apertures, and by utilizing media for changing the circuitous guideway for the film of appropriate dimension. A picture size of 6 perforations could also be obtained on the film crossing the camera in a straight line in the usual way, but then a space of 8 perforations would be lost between the components of each pair and the foot of film would contain only 3 such pairs instead of 5. Furthermore, it would be necessary, in order to change the views, to pull the film a distance of 20 perforations, this corresponding practically to the outside length of the viewer would make difficult the use of a mechanical device for this purpose. With my arrangement, one turn of the drum advances the film the exact distance required for the correct obtention or presentation of the following stereoscopic view.

While the picture size thus obtained is in theory from 33% to 50% larger than the former sizes, the fact that the framing of a subject is most frequently determined by its side margins makes it in practice close to 100% larger, a very appreciable gain.

Referring to the accompanying drawings exemplifying my invention,

Figure 1 is a view, in sectional elevation, showing a stereoscopic apparatus having the arrangement of the film according to my invention;

Figure 2 is a sectional plan view looking into the apparatus in the direction of the arrows at the line II—II of Figure 1;

Figure 3 is a view in sectional elevation of the film carrying portion of the apparatus, looking in the direction of the arrows at the line III—III of Figure 2;

Figure 4 is a view similar to Figure 3, taken along line IV—IV of Figure 2, the arrows indicating the direction of sight and the figure being broken off due to the limitations of the sheet;

Figures 5, 6 and 7 are perspective views of the several separated parts of one type of standard motion-picture film-carrying cartridge;

Figure 8 shows a strip of film illustrating the arrangement of the views thereon, the strip being broken at several points due to limitation of the sheet; and Figure 9 is a view similar to Figure 1 of another arrangement for carrying out the objects of my invention.

In the drawings, it will be seen that the apparatus is constructed in two parts which are readily separable to facilitate loading of the same. The numeral 10 designates the lens and shutter carrying portion, and the numeral 11 designates the film carrying portion. It will be understood that the member 10 carries suitably spaced lenses 12 spaced at the proper focal distance from the plane of the film.

In securing the parts 10 and 11 together, I have provided undercut sliding grooves by means of which the portion 10 may be slid into light-proof engagement with the member 11, and the member 11 is provided with a film protecting slide 13 which may be used to exclude light from the film holder 11 when the lens carrying portion 10 is removed therefrom in daylight.

The film carrying portion 11 is provided with spaced windows 14, adjacent which the film is adapted to pass. The film designated by the numeral 15 is adapted to be drawn from a film holder 16 to be hereinafter described, and through the body of the member 11 adjacent the openings 14 over a measuring drum 17 and onto a spool 18, The path of the film, in its travel from the holder 16 to the spool 18, is defined by a series of rollers 19, 20, 21, and the measuring drum 17. Cooperating with the rollers 20 and 21, and spaced between the windows 14, is an additional deflecting or loop forming roller 22. The function of this roller 22 is in the nature of a take-up between the windows 14, so that a greater length of film may be disposed therebetween than would be the case if the roller 22 were omitted. This is one of the respects in which my invention distinguishes from the prior art, and upon it I desire to lay stress; for, it is to this arrangement that I attribute the results obtained.

Referring now to the spacing of the film-measuring or counting drum 17, it will be noted that this drum carries teeth which engage the perforations in the film, and as a result its movement determines that of the film, and the latter must correspond thereto. The circumference of this drum is made equal to that of the fractional picture width, and a latch mechanism is provided, which prevents more than one revolution of this counting drum 17 at a time.

The counting drum 17 is adapted to be rotated by the film as it is wound upon the spool 18. Arranged upon the drum 17 is a single projecting pin 23 which is adapted to engage the teeth of pinion 24, arranged between the drum 17 and spool 18, Figures 1 and 2, once during each revolution of the drum 17 so that the pinion 24 will move a circumferential distance corresponding to one tooth upon every revolution of the drum 17. The pinion 24 in turn meshes with a toothed gear wheel 25 which is in turn associated with an indicating disc 26 on the axis of the spool 18. The indicating disc 26 carries graduations which cooperate with an index or pointer upon the film carrying portion 11, and in this manner it serves to identify the particular number of the exposure, so that by observing this index reading, the operator may determine at any time just how many pictures he has viewed or taken.

By referring to Figure 2 of the drawings, it will be seen that the indicating disc 26 is located outside of the film compartment where it is always in view. It will be understood that this disc 26 revolves freely with the gear 25 about the shaft upon which the spool 18 is mounted. This figure of the drawing also shows a flat spring 27 which serves to hold the spool 18 in its proper position upon its shaft, the spring 27 being fixed upon a side or cover 28 which is removable from the film retaining housing 11. The cover member 28 also carries a locking means 29 which engages, by means of pins 30 carried thereby, with bayonet slots 31 in the film supporting framework. Associated with the locking means 29 is shown a mutilated gear 32, a pinion 33 and a gear 34. These latter elements are adapted to cooperate with the cover locking means 29 so as to open and close the light-proof film holder 16, see Figures 5, 6 and 7, as the cover 28 is locked and unlocked upon the film carrying portion 11. The operation of these latter elements in connection with the locking member 29 will be better understood from the following taken in connection with Figures 3 and 4 of the drawings.

In Figure 3, the gear 32, which is fixed upon the locking member 29, is shown as meshing with the teeth of the pinion 33 and the teeth of the pinion 33 are shown as meshing with the gear 34. The gear 34 has a recess 35, into which a projecting crank 36, projecting from a member of the film holder 16, is adapted to engage.

When the film holder 16 is closed, as would be the case with the cover 28 removed, the pin 36 will be disposed as illustrated in dotted lines in Fig. 3 of the drawings, and the recess 35 in the gear 34 will be disposed in substantial alignment therewith so that, when the cover 28 is placed upon the member 11, the crank 36 will enter the recess 35. Under these conditions, the projecting pins 30 upon the member 29 will be substantially as shown in dotted lines. From this it will be seen that, as the locking member 29 is rotated 90°, the gear 34 will be rotated by the gear 33, and thus the recess 35 will turn the crank 36 about the axis of the film holder 16, and in this manner the film holder 16 will be opened when the cover 28 is locked upon the housing 11.

In Figure 4, which is a view showing the interior of the member 11 with the cover 28 removed, it will be seen that there is also provided with the film holder 16 a latch 37. This latch 37 is carried by the film holder 16 and is adapted to maintain the light excluding shutter thereof in its closed position. In order to release this latch 37 I have provided upon the cover 28 a downwardly projecting means 38 which acts to displace this latch and unlock the shutter upon the film holder 16, when the cover 28 is properly in place. In this view the upper side of the film carrying frame is designated by the numeral 39 and the member which provides the bayonet slots 31 is designated by the numeral 40. It will be understood that the side frame members 39 are spaced properly by means of studs 41, illustrated in Figure 2 of the drawings.

In Figures 5, 6 and 7, the film retaining cartridge 16 is illustrated as exploded or separated. In these views 42 designates an outer sleeve, 43 designates the film spool upon which the film 15 is originally wound, and the numeral 44 designates a sliding sleeve or shutter which surrounds the spool 43 and is retained within the cylinder 42. The cylinder 42 has an aperture 45, and the shutter 44 has an aperture 46. When the film retaining spool 16 is open, the apertures 45 and 46 will be in register, and when the film holder is closed against the admission of light the cylinder 44 will be rotated, as previously described, by means of the recess 35, and crank 36, to a position where the apertures 45 and 46 will be out of registry.

In Figure 8 there is shown a strip of film upon which the arrangement of the successive picture areas is illustrated. From this illustration it may be seen that, after the operation of exposing the film has been started, there is no waste of film between the successive pictures, the only blank in this procedure being that of the second picture area from each end, designated by the word "Blank" in the illustration. In this view of the drawing it will also be seen that the width of the pictures in each case is equal to a distance corresponding to six film perforations as distinguished from four heretofore possible in films of this type.

In Figure 9 I have illustrated another form of my device. In this embodiment the film retaining housing designated by the numeral 11' is shown as having rounded ends somewhat after the fashion of standard cameras and the film measuring drum, designated by the numeral 47, is disposed between the view framing apertures 14 so that it will perform the dual function of measuring and feeding the film and at the same time take up the film between the successive views. The film holder 16 and the film spool 18 are shown as disposed in the opposite extreme ends of the film carrying portion 11.

From the foregoing description, it will be understood that, while I have described my invention more particularly in connection with stereoscopic devices or apparatus, such as stereopticons and stereoscopes, I desire it understood that it is equally adapted to the production of negatives or fractional frame pictures to be used in stereoscopic devices or apparatus or moving picture film projectors. In other words, as originally set forth, my invention comprehends the idea of means of increasing the size and number of moving picture or fractional views of a given object, and the use of the same in an apparatus capable of either viewing, taking or projecting such pictures, the object being to convert the initial rotary movement of the film into a right-line movement during the process of shifting the strip or the pictures or fractional picture frames of the strip, regardless of the type of apparatus in which the film or strip may be manipulated. And it will be readily seen that the general principle involved is that of increasing the size of the view or the area of the view or fractional portion thereof on the film by so manipulating the film strip as to produce a loop therein simultaneously with the shifting thereof, and also to positively determine the movement of the film either by the loop forming mechanism or a mechanism cooperative with the loop forming device, in either instance elements for shifting and controlling the travel of the film having the effect of positively advancing the film, converting it into a loop, and controlling the extent of travel of the film. That is to say, for the purposes of my broad invention, I manipulate a picture film, regardless of its specific use, so as to give the same a circuitous path through the device. This path may be produced by the utilization of a guideway, including a roller or rollers which form the film into a loop of appropriate size.

Having thus described my invention, what I claim and desire to secure by Letters Patent is:

1. In a stereoscopic apparatus, including a carrying portion having suitably spaced lenses and a detachable film carrying portion having correspondingly spaced exposure fields, means for supporting a film in the detachable portion, means for feeding the film in the latter at an angle to the lenses, and means interposed in the path of the film between the exposure fields for elongating its course and positively feeding the same in a continuous manner through the apparatus.

2. In a stereoscopic apparatus having lenses and corresponding exposure fields, means for supporting a film therein, means for feeding the film at an angle to the lenses, and means interposed in the path of the film for elongating its course between the exposure fields, so that larger and more rational stereoscopic views having the normal pupillary spacing may be obtained in a continuous manner and in properly interspaced order.

3. In a stereoscopic apparatus having lenses and corresponding exposure fields, means for supporting a film therein, means for feeding the film at an angle to the lenses, and means interposed in the path of the film for elongating its course between the exposure fields, so that larger and more rational stereoscopic views having the normal pupillary spacing may be obtained in a continuous manner and in properly interspaced order, said means including a circuitous guideway of predetermined length.

4. In an apparatus as stated, a lens carrying portion, a film carrying portion, means detachably connecting the two portions together, means within the film carrying portion for supporting and traversing a film lengthwise of the film carrying portion and at an angle to the lenses, means interposed in the path of the film for elongating its course, said means being a plurality of rollers of predetermined size around which the film is guided and one of which is placed approximately midway the terminals of the film.

5. In an apparatus as stated, a lens carrying portion, a film carrying portion, means detachably connecting the two portions together, means within the film carrying portion for supporting and traversing a film lengthwise of the film carrying portion and at an angle to the lenses, means interposed in the path of the film for elongating its course, said means including a roller of predetermined size having peripheral teeth thereon adapted to engage and positively drive the film.

6. In an apparatus of the type indicated, a lens carrying and supporting portion, a film carrying portion, means between the two portions for detachably connecting the same and enabling one to support the other, the film carrying portion having openings, a shutter carried by one of the members for covering said openings, means within the film carrying portion for supporting, guiding and feeding a film, said means including a film holder, a measuring drum, a film supporting spool, and guiding rollers disposed midway of the film carrying portion and spaced centrally with reference to the lenses of the supporting portion.

7. In an apparatus of the type indicated, a lens carrying portion having spaced apart lenses, a film carrying portion, and means within the latter for supporting and positively feeding a film relatively to the lenses and including a device by means of which the film may be caused to travel a circuitous path within the film carrying portion and relatively to the lenses.

8. In an apparatus of the type indicated, a film carrying portion, lens carrying means for supporting the same, and means within the film carrying portion for supporting, traversing and guiding a film relatively to the lens carrying means, said means comprising a film holder at one end of the film carrying portion, a measuring drum at the other end of the film carrying portion, and a deflecting device between the film holder and the measuring drum for guiding and causing the film to traverse a circuitous path within the film carrying portion.

9. An apparatus of the type indicated in claim 8, wherein the film holder is provided with a protective shutter.

10. An apparatus of the type indicated in claim 8, wherein the measuring drum is provided with means by which to positively feed the film a predetermined distance for every revolution thereof.

MAURICE FAYOLLE.